United States Patent
Lee et al.

(10) Patent No.: US 7,335,067 B2
(45) Date of Patent: Feb. 26, 2008

(54) CONNECTOR FOR HARSH ENVIRONMENTS

(75) Inventors: Kang Lee, Woodland Hills, CA (US); Thomas Forrester, Westminster, CA (US); Tomasz Jannson, Torrance, CA (US); Andrew Kostrzewski, Garden Grove, CA (US); Gajendra Savant, Rolling Hills Estates, CA (US)

(73) Assignee: Physical Optics Corporation, Torrance, CA (US)

( * ) Notice: Subject to any disclaimer, the term of this patent is extended or adjusted under 35 U.S.C. 154(b) by 119 days.

(21) Appl. No.: 11/191,094

(22) Filed: Jul. 27, 2005

(65) Prior Publication Data
US 2007/0025809 A1    Feb. 1, 2007

(51) Int. Cl.
*H01R 13/24* (2006.01)
(52) U.S. Cl. .................. 439/700; 439/824; 439/289
(58) Field of Classification Search ............. 439/700, 439/824, 289
See application file for complete search history.

(56) References Cited

U.S. PATENT DOCUMENTS

| 3,521,216 | A | * | 7/1970 | Tolegian ................ 439/39 |
| 4,034,172 | A | * | 7/1977 | Glover et al. .......... 200/51.1 |
| 4,950,171 | A | * | 8/1990 | Muzslay ................ 439/76.1 |
| 2003/0040247 | A1 | * | 2/2003 | Rehkemper et al. ...... 446/34 |

\* cited by examiner

*Primary Examiner*—Tho D. Ta
*Assistant Examiner*—Travis Chambers
(74) *Attorney, Agent, or Firm*—Sheppard Mullin Richter & Hampton LLP

(57) ABSTRACT

Two embodiments of a connector that can be mated without regard for its orientation are disclosed. One embodiment is mated and demated autonomously as part of a system for recovering, docking with, recharging and re-launching unmanned aerial vehicles. Another embodiment is employed on the decks of vessels to facilitate mating and demating of various equipment providing different functions to reconfigure the vessel. Because both embodiments are configured for connection irrespective of angular orientation over 360°, they are especially suited for harsh environments including autonomous operation, rough seas, darkness and the like.

14 Claims, 18 Drawing Sheets

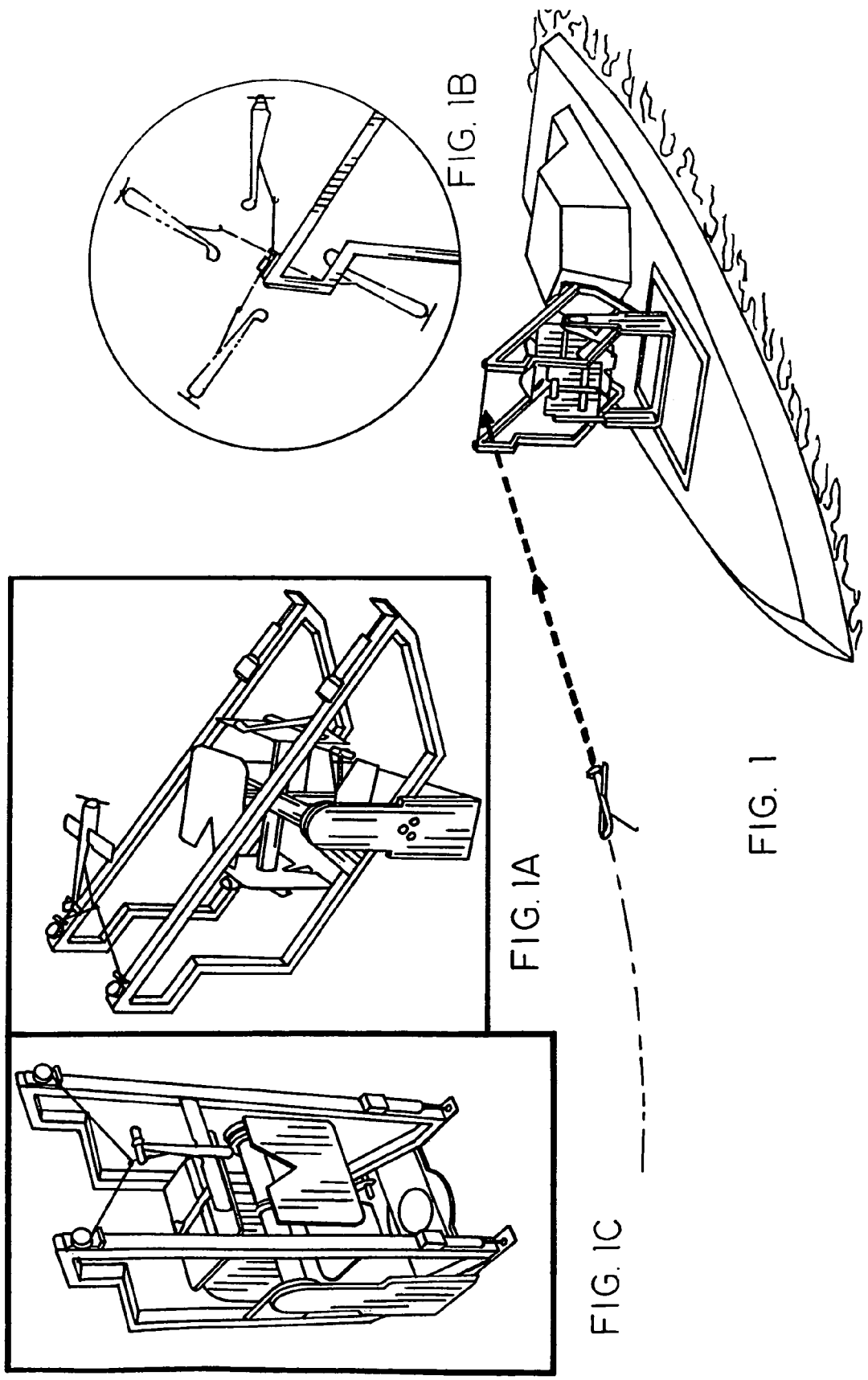

360° SYMMETRICAL CONNECTOR

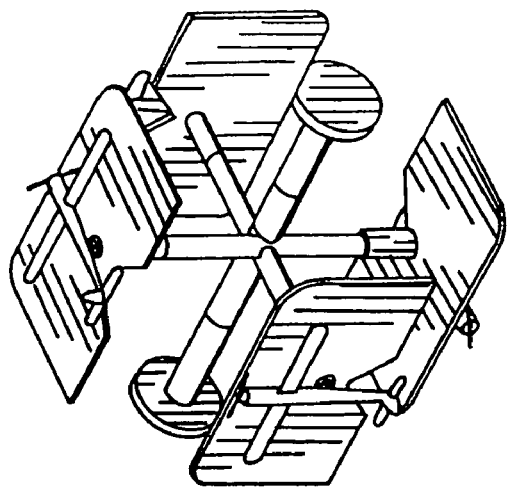
FIG. 2E  UAV ROTATION DOCKS
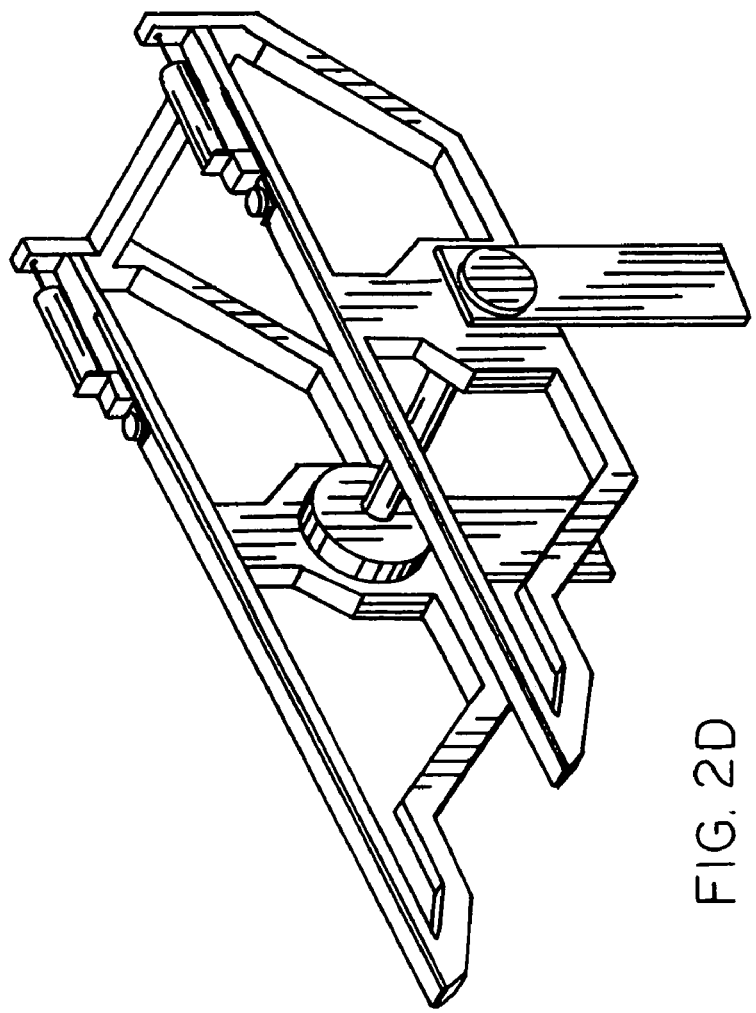
FIG. 2D  LAUNCH & RECOVERY STATION

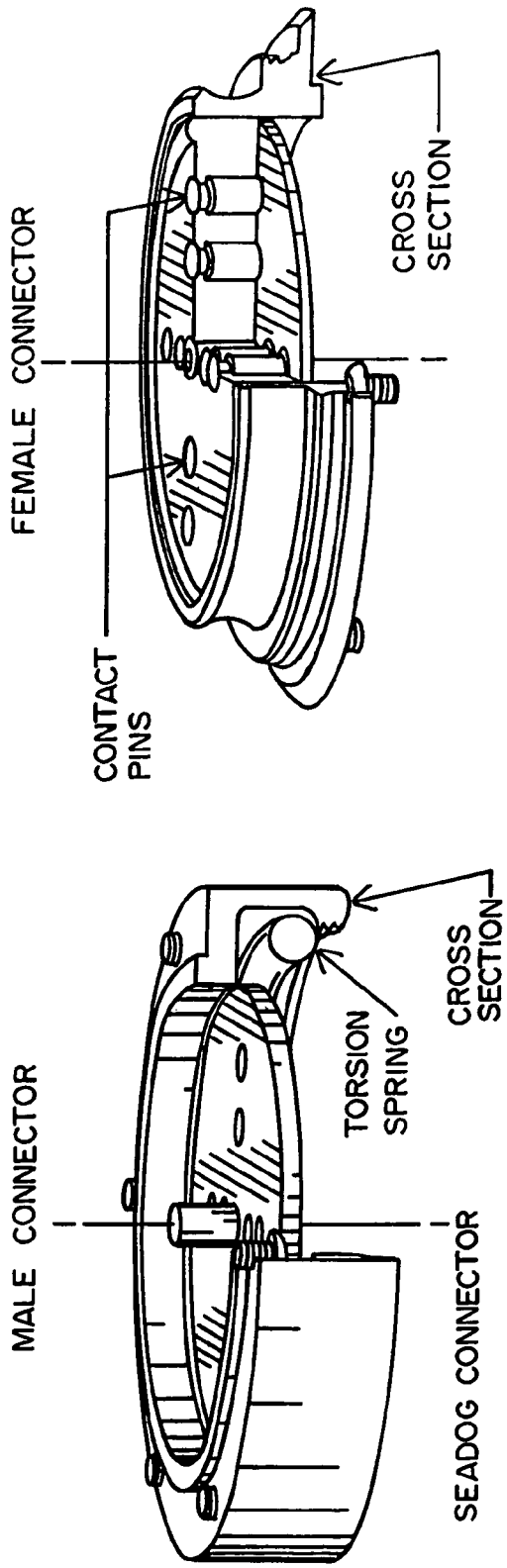
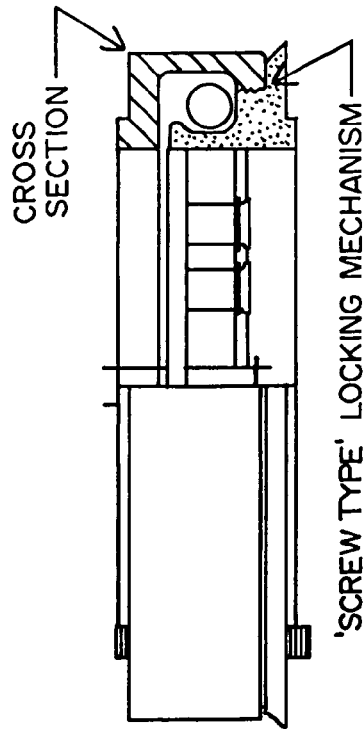
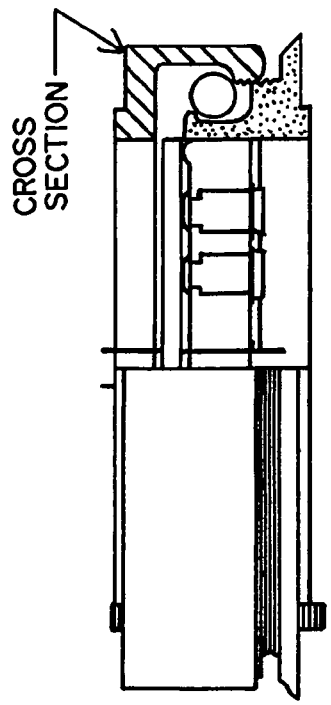
FIG. 11A
FIG. 11B 1st LEVEL SELF-ALIGNMENT INTERLOCK MATED POSITION
FIG. 11C 2nd LEVEL INTERLOCK 'SCREW TYPE' LOCKING MECHANISM

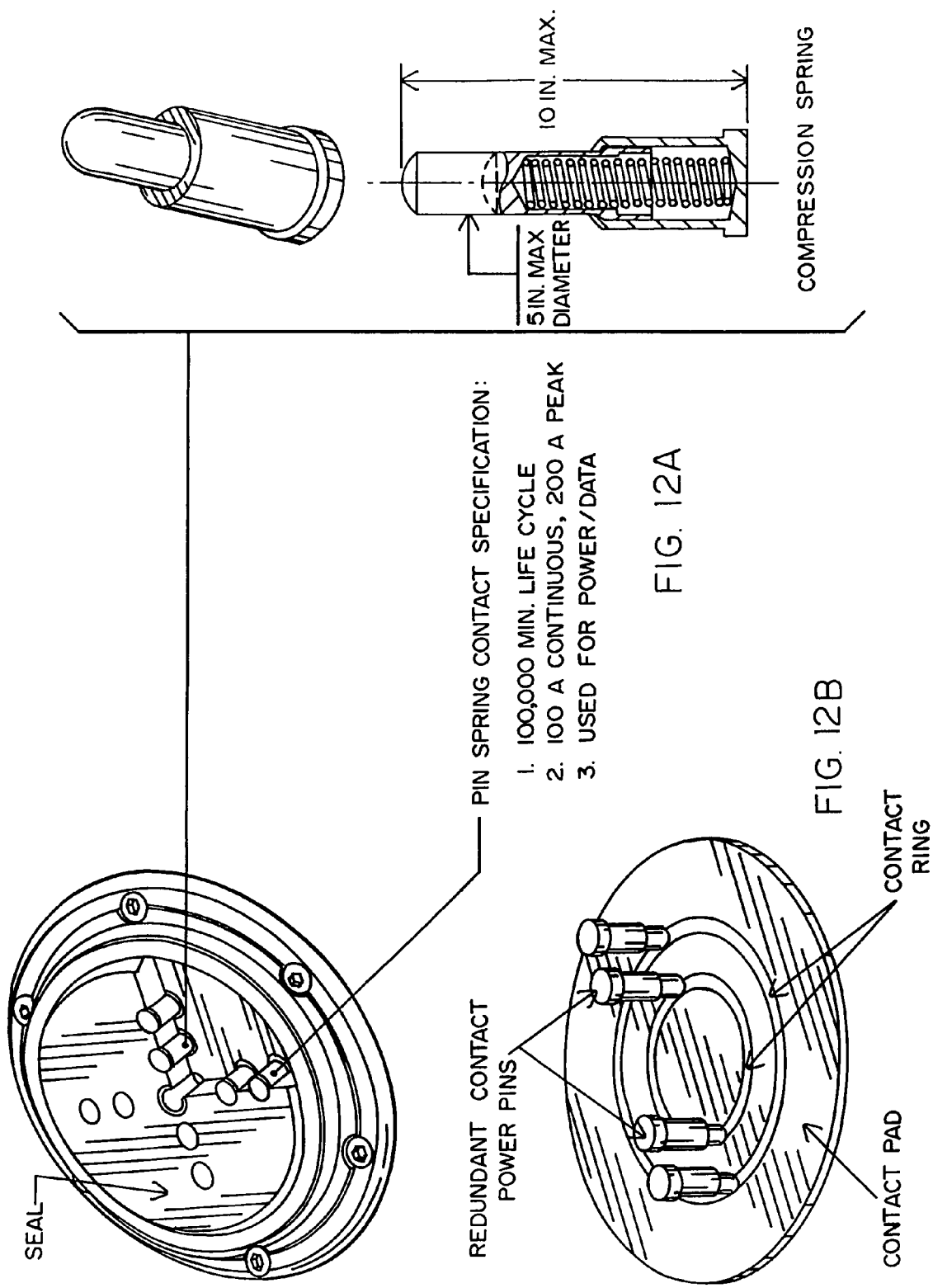

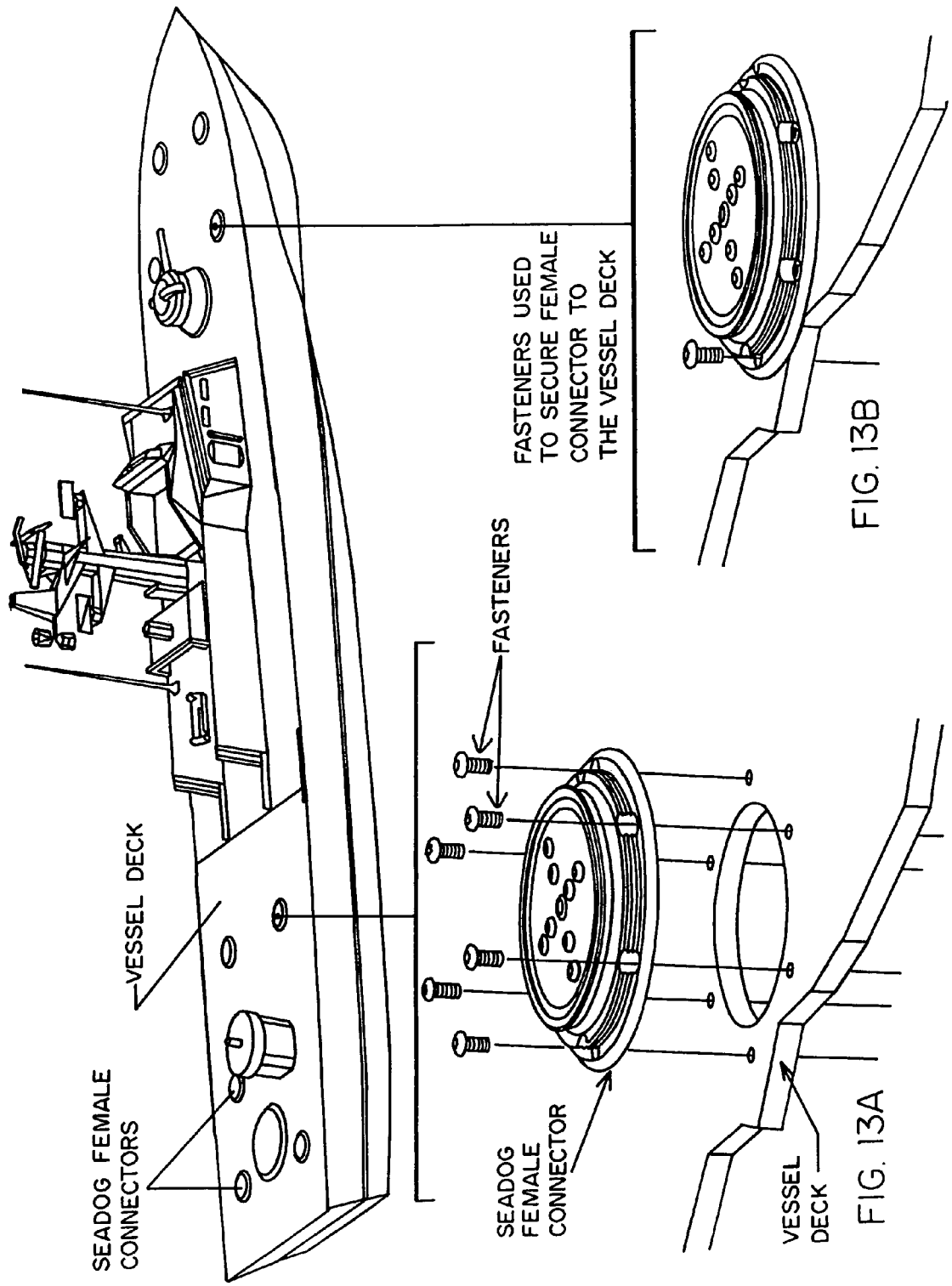

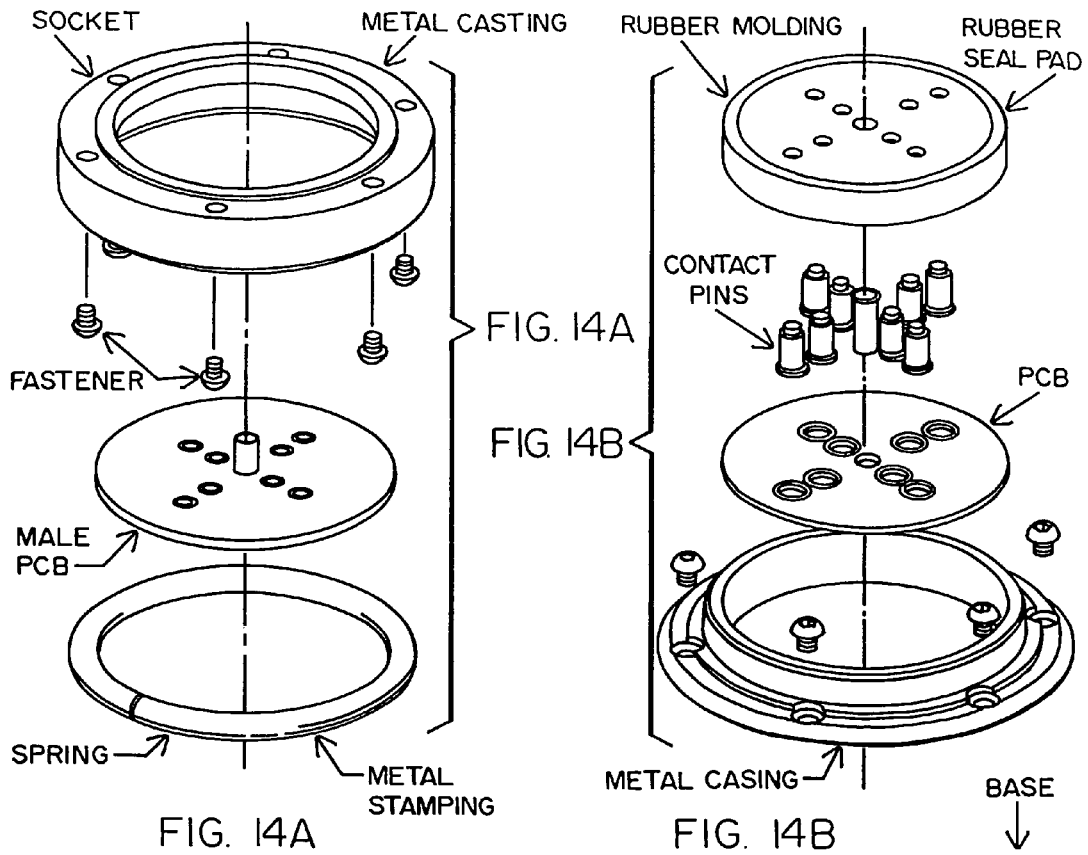
FIG. 14A
FIG. 14B
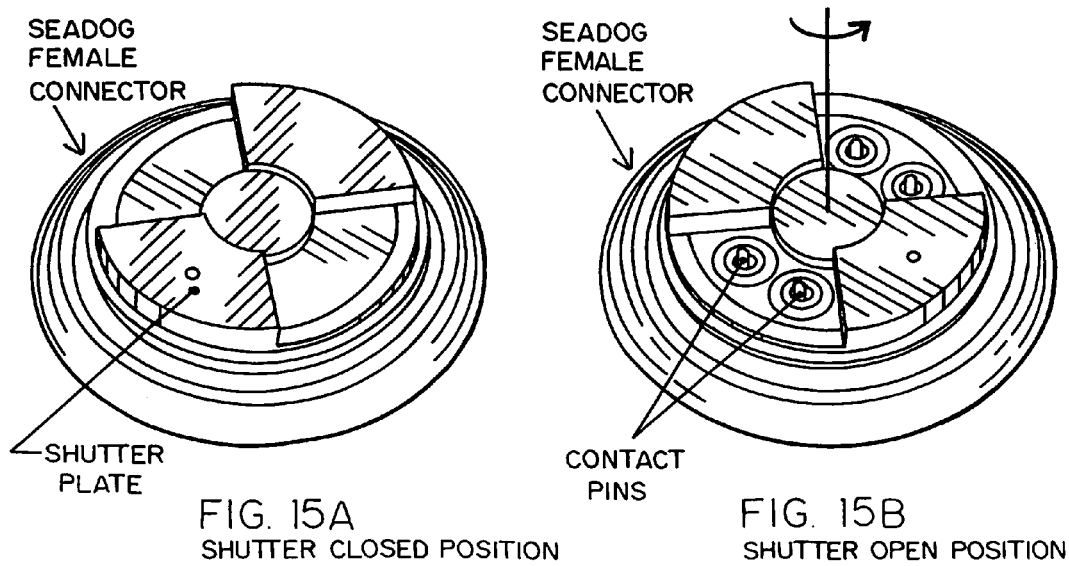
FIG. 15A
SHUTTER CLOSED POSITION
FIG. 15B
SHUTTER OPEN POSITION

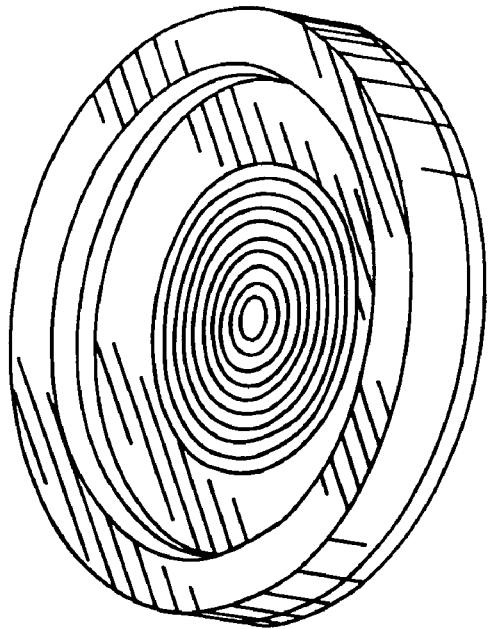
MALE SEADOG CONNECTOR
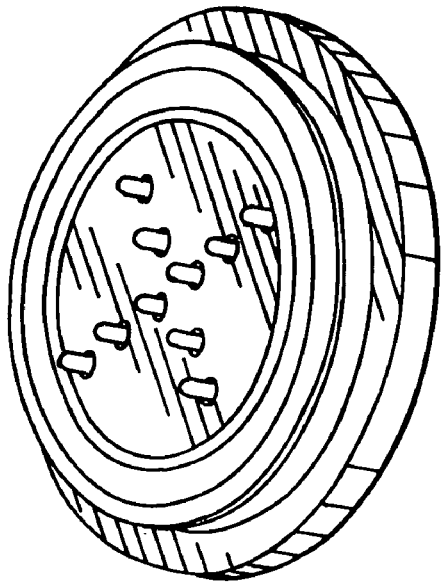
FEMALE SEADOG CONNECTOR
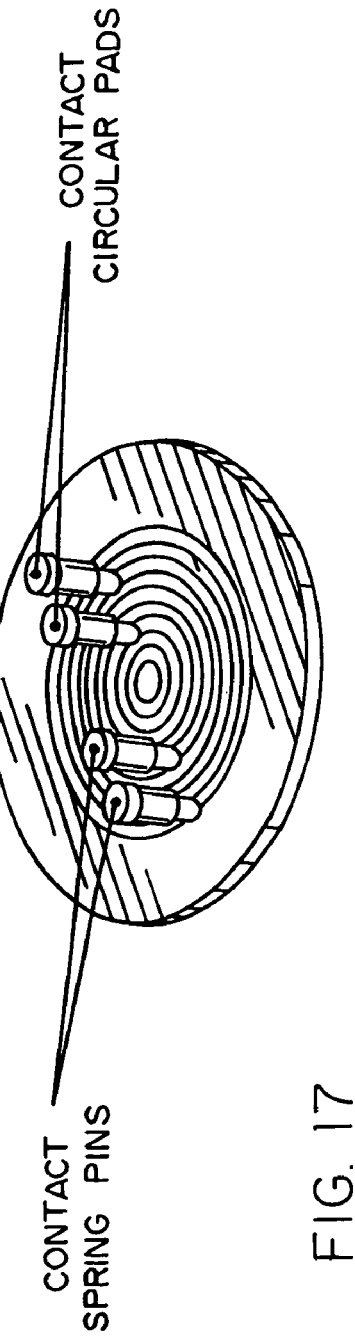
360° SYMMETRICAL CONCEPT
CONTACT CIRCULAR PADS
CONTACT SPRING PINS
FIG. 17

CONNECTOR FOR HARSH ENVIRONMENTS

BACKGROUND OF THE INVENTION

1. Field of the Invention

The present invention relates generally to connectors for "blind" orientation independent mating of electrical and mechanical interfaces. The invention relates more specifically to connectors for coupling electrical and non-electrical interfaces in difficult environments including scenarios where there may be remote docking or harsh weather, total darkness, high seas or combinations thereof. One embodiment disclosed is especially suited for use with autonomous UAV recovery and docking. Another is particularly configured for use as a multifunction shipboard connector to attach deck-mounted hardware to a ship's structure and thus enable ship reconfiguration.

2. Background Art

There are certain special mating requirements for connectors in conditions where it is difficult, if not impossible, to carefully align mating male and female connector portions. One such condition occurs where such mating is carried out autonomously with little or no human intervention. Another such condition occurs where such mating is attempted under adverse conditions such as in bad weather or in high seas or in total darkness where it is difficult to assure or maintain vertical angular alignment between male and female portions. The autonomous condition arises, for example, in the recovery and recharging/refueling of unmanned aerial vehicles (UAVs) for re-launch, all from using unmanned automated equipment.

Current shipboard-mounted UAV launch and recovery (L and R) systems can autonomously launch and capture UAVs, but require manual intervention for the full cycle of recovery, recharging/refueling, and re-launching. A fully autonomous, robotic L and R system will increase the flexibility of UAV use by the U.S. Navy, Homeland Security, other U.S. Government services and agencies, search and rescue teams, law enforcement, firefighters and private sector entities. Such commercial applications include, but are not limited to, oceanograhpic survey operations, aerial photography, offshore oil exploration, ocean salvage operations and recreational UAV flight by the public.

In regard to adverse conditions, among the most difficult are connections between very heavy equipment made at sea.

The solution is a novel and rugged multi-function connector for heavy shipboard equipment that can transmit power and data and support future surface combatants' modular configuration requirements. This multi-function connector must be simple and easy to use, universal and standardized and physically able to secure many sizes and shapes of equipment to a vessel structure. The development of rapidly and easily reconfigurable "plug and play" equipment will in turn support the achievement of mission objectives and reduce equipment lifecycle costs. The connector should be as flexible as possible, handle a wide variety of currents and voltages, meet all requirements for strength, shock, vibration and marine environment functionality, not interfere electromagnetically with onboard electronics systems and meet all safety requirements.

Current deck-mounted hardware typically attaches permanently to the ship's structure. It is difficult to reconfigure these single-purpose ships to fill gaps in a conventional naval force structure. This makes it difficult or impossible to leverage ships in situations where naval forces are scarce in a certain geographical location, or during times of simultaneous conflicts in widely separated theaters of operation. Having a multi-function, rugged, easy-to-use connector directly addresses this problem and makes it possible to reconfigure mission specific ship operations in real time.

SUMMARY OF THE INVENTION

To meet the need for an unmanned, autonomous, robotic L and R system, the present invention facilitates a Self Aligning Tactical Autonomous Connector-based (SEATAC) UAV Launch and Recovery system. This system is a combination of ruggedized connector technology and an innovative and robust, autonomous robotic L and R technology. The SEATAC system will meet needs to autonomously launch, capture, recover, recharge, refuel, acquire critical data from, reprogram/re-purpose and re-launch small UAVs.

An unmanned surface vehicle (USV) fitted with a SEATAC system will have an autonomous launch and recover station to capture four unmanned aerial vehicles fitted with an auto-extending tailhook connector subsystem. A collision avoidance robotic system, will assign a safe approach trajectory if required. Once the UAV has been captured, it is prepared for recovery by the launch and recovery system (L and R). After recovery, it is prepared for docking, recharging/refueling and re-launch by the rotating docking station, via a 360° symmetrical connector (360SC).

To meet the U.S. Navy need for a multi-function shipboard connector, a new Selectable Error-free Analog and Digital Operational Grid (SEADOG) connector is described herein. The SEADOG connector is a novel 360-degree blind symmetrical connection designed to quickly and easily attach hardware to a ship's structure in any type of weather or sea state condition. Furthermore, a unique Universal Sensor Interface Module (USIM) will give SEADOG the capability for rapid self-correcting connections for both power and data, to ensure seamless multimedia communication, constant video throughput, reliable sensor data and real-time targeting information. Another unique advantage of SEADOG, the self-actuating environmental seal, closes automatically whether connected or unconnected, to protect mechanical and electrical components for salt spray, salt fog, saltwater immersion and other harsh marine environmental conditions. A shutter or O-ring mechanism will protect the electrically sensitive parts of a female connector that is secured to the vessel structure.

Not only does the SEADOG connector maintain positional and mechanical integrity at the highest sea-states, but the USIM will also ensure power and data integrity in the noisy shipboard digital domain. The SEADOG connector addresses the Navy requirement for a reconfigurable and flexible connector and also has significant commercial applications in the fields of law enforcement and homeland security and for first responders and fire and rescue teams, where limited budgets have dictated that single vehicles be used for multiple purposes.

The SEADOG connector is equipped with a two-level mechanical interlocking mechanism. A first-level interlocking snap connector functions as both a conservative interlocking mechanism and, more importantly, a self-aligning/self-guiding mechanism to aid in the mating of the SEADOG connector portions. It also positions the SEADOG connector portions in the proper mechanical position for the smooth engagement of the second level interlocking mechanism. This second level is preferable for securing and stabilizing large loads in the harsh shipboard environment.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 1 including FIGS. 1(a), 1(b) and 1(c) is a photographic collage of the SEATAC system wherein the system is shown deployed on an unmanned surface vehicle (USV); (a) the UAV is captured; (b) the UAV spins after capture to dissipate energy; and (c) the UAV is prepared for docking and refueling/recharging;

FIG. 2, comprising FIGS. 2(a), 2(b), 2(c), 2(d) and 2(e) illustrates (a) the SEATAC system deployed on the USV; (b) the UAV with an auto-extending tailhook connector subsystem; (c) one portion of the 360° symmetrical connector of the invention herein; (d) the launch and recovery station; and (e) the UAV rotating docking station;

FIG. 11, comprising FIGS. 11(a), 11(b) and 11(c) is a photograph and diagram of the SEADOG connector interlocking mechanism showing the connector (a) unmated, (b) in torsion-spring-based first-level self-alignment interlock mated, and (c) screw-thread-based second-level interlock mated;

FIG. 12, comprising FIGS. 12(a) and 12(b), illustrates (a) the spring-loaded pins of the SEADOG connector and (b) the contact pad and exemplary pins of the SEADOG connector;

FIG. 13, comprising FIGS. 13(a) and 13(b), illustrates the SEADOG connector mounting procedure on the deck of a vessel including (a) the matching bolt patterns of connector and deck and (b) the female SEADOG connector portion attached to the vessel deck;

FIG. 14 is an exploded view of the SEADOG connector components indicating the associated manufacturing processes;

FIG. 15, comprising FIGS. 15(a) and 15(b), is a photograph of the X-shaped shutter plate of the SEADOG connector in the (a) closed position and in the (b) opened position;

FIG. 17 is a detailed display photograph of the female and male connector portions illustrating the 360° feature thereof.

DETAILED DESCRIPTION OF PREFERRED EMBODIMENTS

Connector for Autonomous Operations (SEATAC)

Figure 2A:
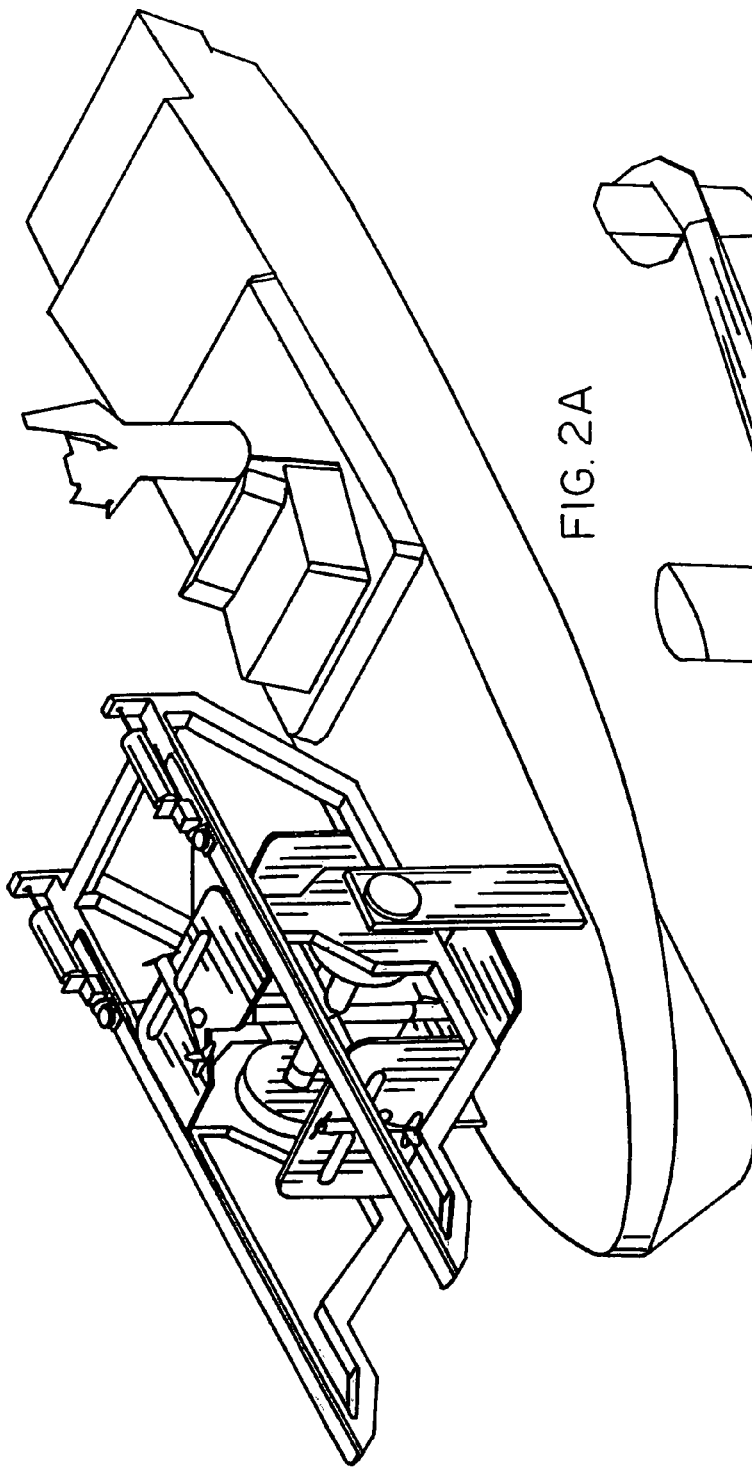
Figure 2B:
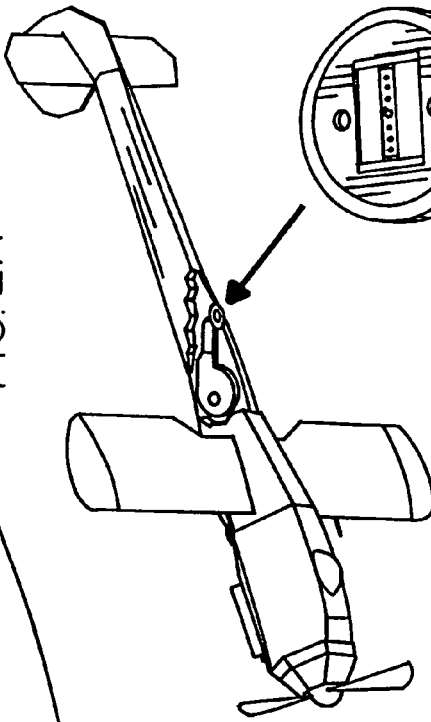
Figure 2C:
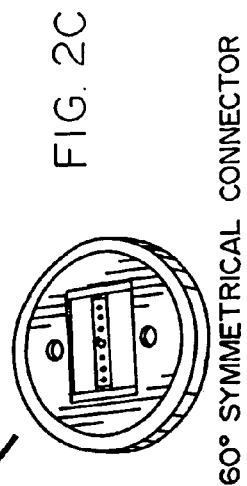

Referring to the accompanying figures and to FIG. 1 in particular, it will be seen that by way of an example of autonomous operation, a SEATAC system is fielded aboard an unmanned surface vehicle (USV) where (a) the UAV is captured, (b) the UAV spins and dissipates energy, and (c) the UAV is prepared for docking, refueling and recharging using the novel connector embodiment of the present invention. FIG. 2 illustrates in further detail: (a) the unmanned surface vehicle fitted with the SEATAC system; (b) the UAV; (c) the SEATAC embodiment of the symmetrical connector (360SC); (d) the SEATAC launch and recovery station (LRS); and (e) the SEATAC UAV rotating docking station (RDS).

Figure 3:
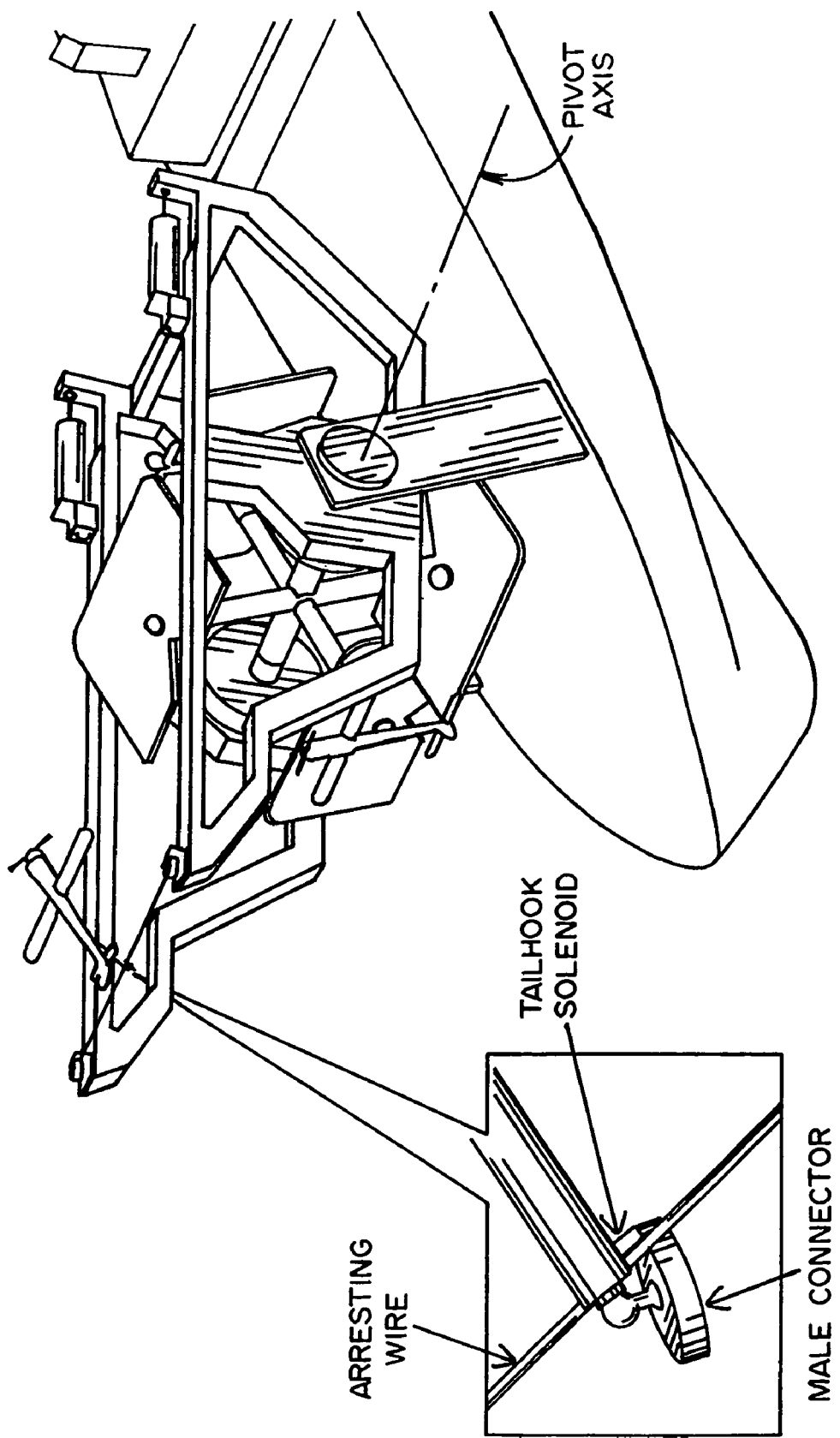
FIG. 3 is a photograph of the SEATAC system showing the capture phase in greater detail.

The first phase of UAV recovery in the SEATAC system is the "capture phase", depicted in FIG. 3. An incoming UAV approaches the USV-mounted launch and recovery station. The UAV is guided either in automatically piloted vehicle mode or in remotely operated aircraft mode so that its auto-extending tailhook connector subsystem intersects and contacts the arresting cable, which spans the width of the Launch and Recovery System (LRS). The electrically disengagable tailhook is formed by the 360° symmetrical connector (360SC) and a microsolenoid-operated latching mechanism.

Figure 4:
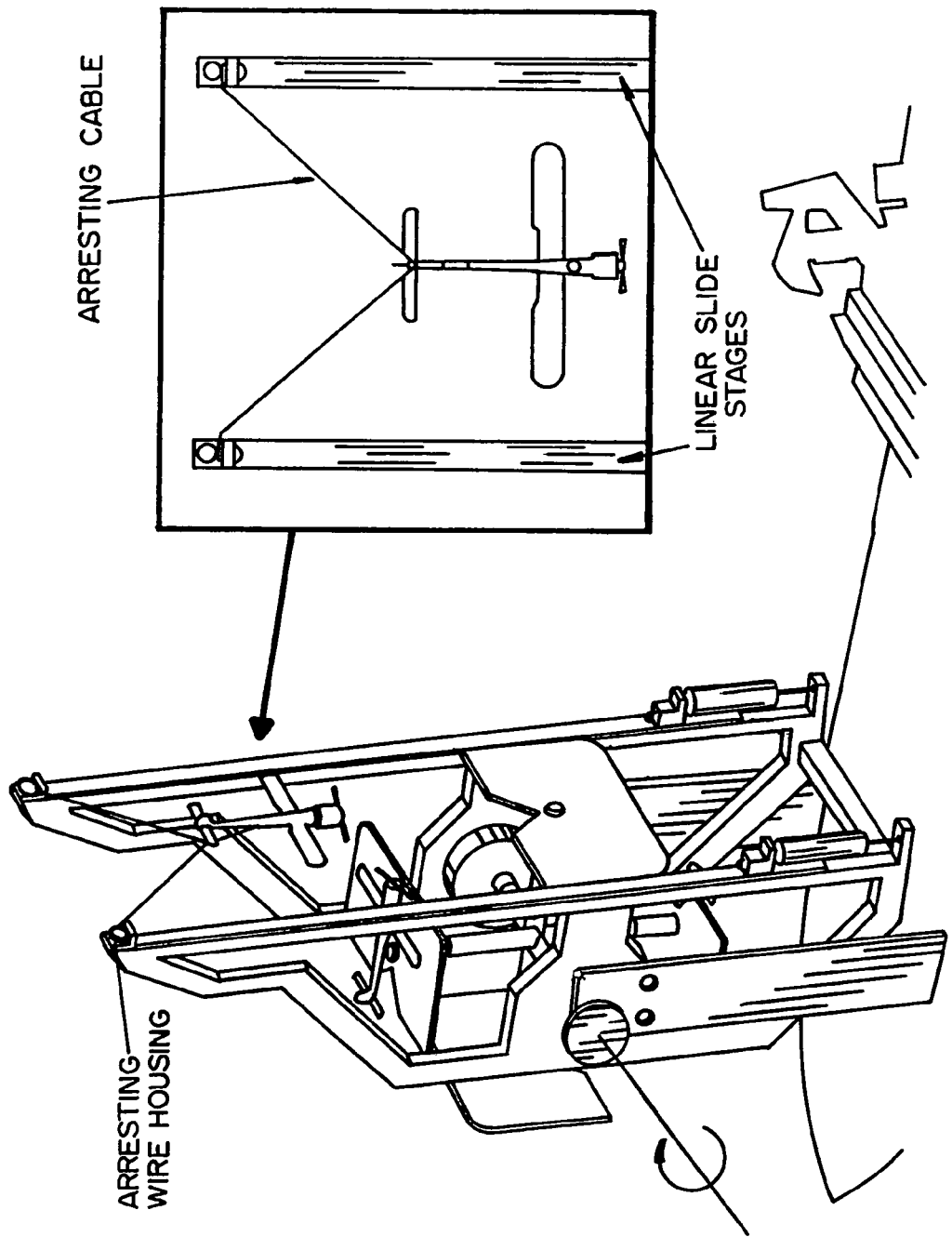
FIG. 4 is a photograph of the SEATAC system showing the recovery phase in greater detail.

FIG. 4 shows the SEATAC system is in the second, or "recovery," phase. In this phase, the captured UAV has its propulsion system disengaged and is hanging freely by its solenoid-locked tailhook. The entire LRS is then rotated ~90° into an "upright" position. Once the LRS is in the upright position, the UAV will "self-center" itself in the middle of the arresting wire under the force of gravity.

Figure 5:
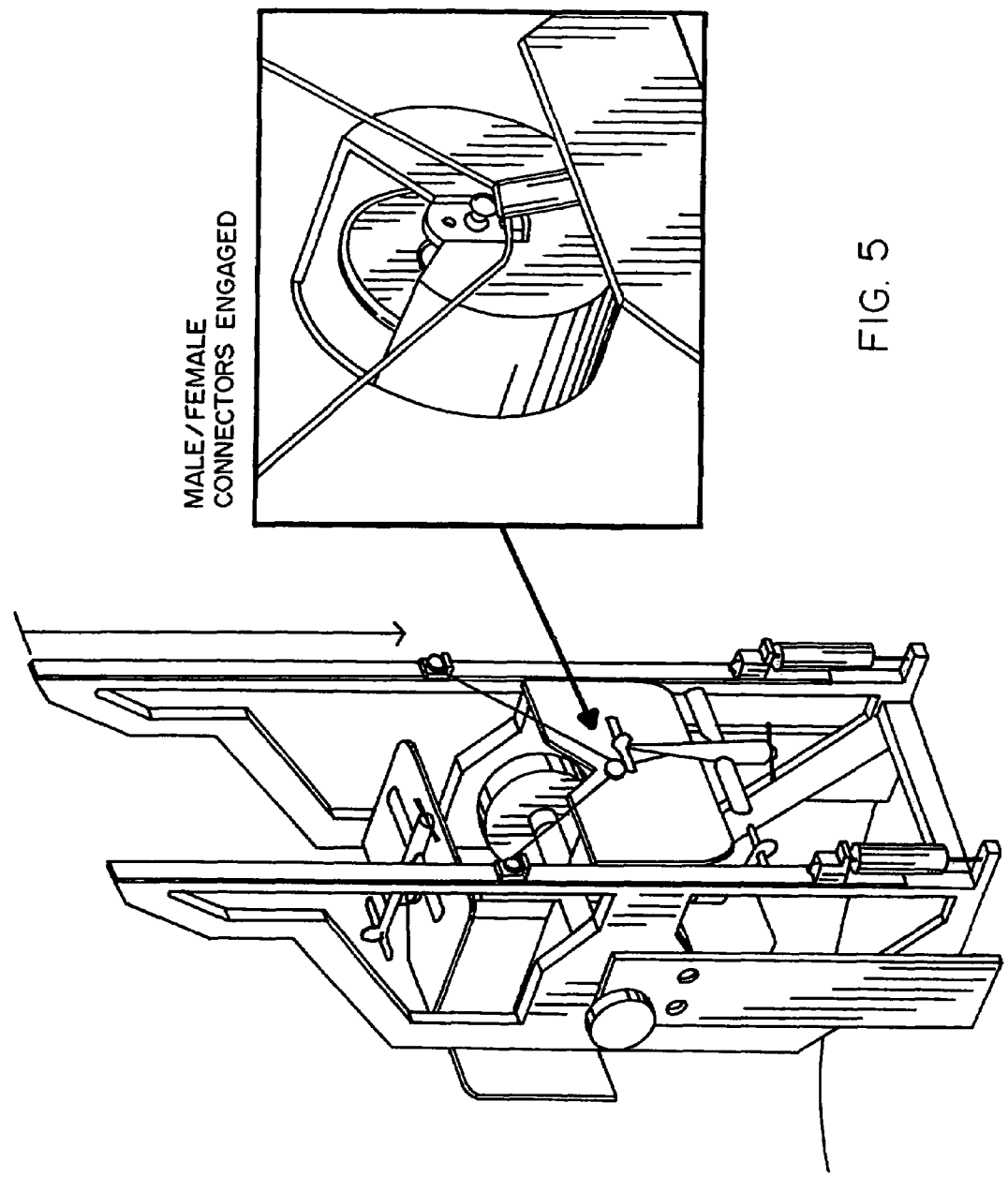
FIG. 5 is a photograph of the SEATAC system showing the docking phase in greater detail including mating of the inventive connector.

The SEATAC system next proceeds to the third phase of autonomous UAV recovery, the "docking" phase, as shown in FIG. 5. After the SEATAC LRS has sensed the capture of a UAV, it will command the RDS to rotate clockwise until an empty (one of four) self-aligning docking platform is in place perpendicular to the USV's top deck and parallel to the hanging UAV. Once the UAV is properly positioned over the empty platform, the LRS will lower the UAV into the platform using two pairs of linear bearings mounted to hardened steel guide rails. The UAV is lowered into a V-shaped slot in the edge of the platform closest to the UAV at the beginning of the docking phase. The tailhook slides along the inner walls of the V-shaped slot, automatically guiding it to the mate for the 360SC connector, which is located at the free end of the tailhook. Once the 360SC connector has been guided to its mating location, a piston rod within the spoke of the RDS associated with the platform brings the female portion of the 360SC connector into electrical and mechanical contact with the male portion of the 360SC connector. Now, the telescoping portion of the tailhook is retracted into the body of the UAV, under RDS power. The arresting cable is now released by an electrical solenoid, which is also powered by the RDS. Finally the arresting cable is retracted via the linear slide rails and constant torque spring/motor assemblies. Power, data and liquid fuel (optional) lines are now attached to the UAV via the present invention, and the fourth stage of the autonomous UAV recovery process, the recharge/refuel and data transfer stage can begin.

Figure 6:
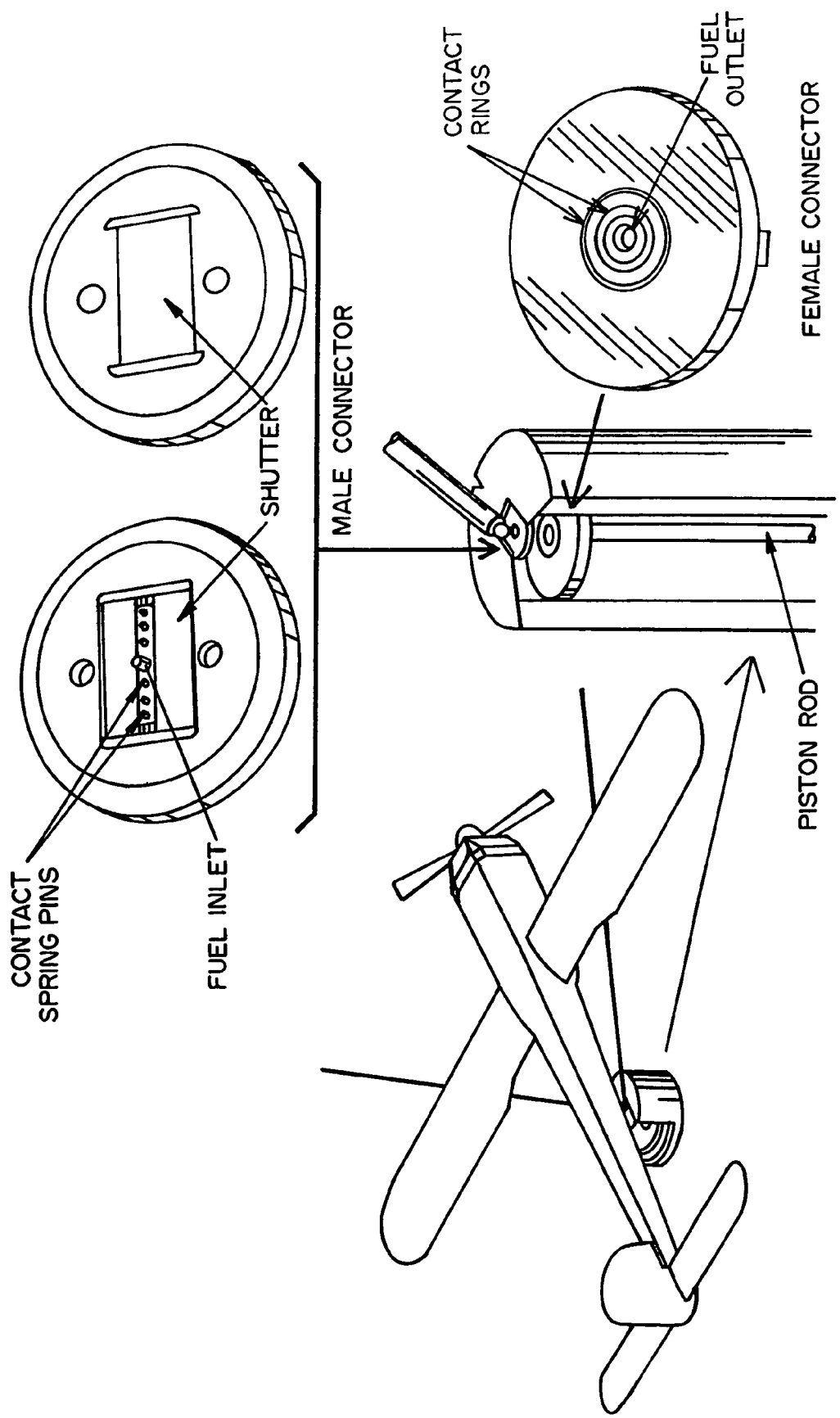
FIG. 6 is a photograph of the SEATAC system showing the recharge/refuel/storage phase in greater detail including details of the male and female portions of the inventive connector.

As shown in FIG. 6, the SEATAC system now enters its fourth phase of autonomous UAV recovery, the "recharge/ refuel/storage" phase. Once the UAV has been successfully docked, it can be recharged and refueled. The electrical power for recharging the UAV is delivered via the high-current-capable brass electrical contacts in the 360SC connector. The 360SC connector also contains low-current, high-bandwidth-capable (>480 Mbps) data connections. These can transfer data to/from the UAV for download of information not already retrieved, for wireless RF communications with the UAV in flight, or for downloading redundant data (possibly containing fewer or no errors) that has already been retrieved. Additionally, the UAV's next flight plan and other mission data can be loaded via a hard-wired, secure and encrypted data link. Optionally, if the UAV is powered by liquid fuel or gasoline, the appropriate fuel can be delivered via a flexible fuel hose and fuel outlet at the center of the female portion of the 360SC connector. During the docking phase, a leakproof seal is formed between this fuel outlet and the fuel inlet at the center of the male portion of the 360SC connector. The piston rod maintains this leakproof seal (as well as solid electrical connections) by keeping constant mating pressure between the two portions of the 360SC connector. This actively maintained positive pressure mating is important to this phase of the operation, as any contact-bounce during refueling can produce electrical arcing, which could ignite the UAV's liquid fuel supply.

Figure 7:
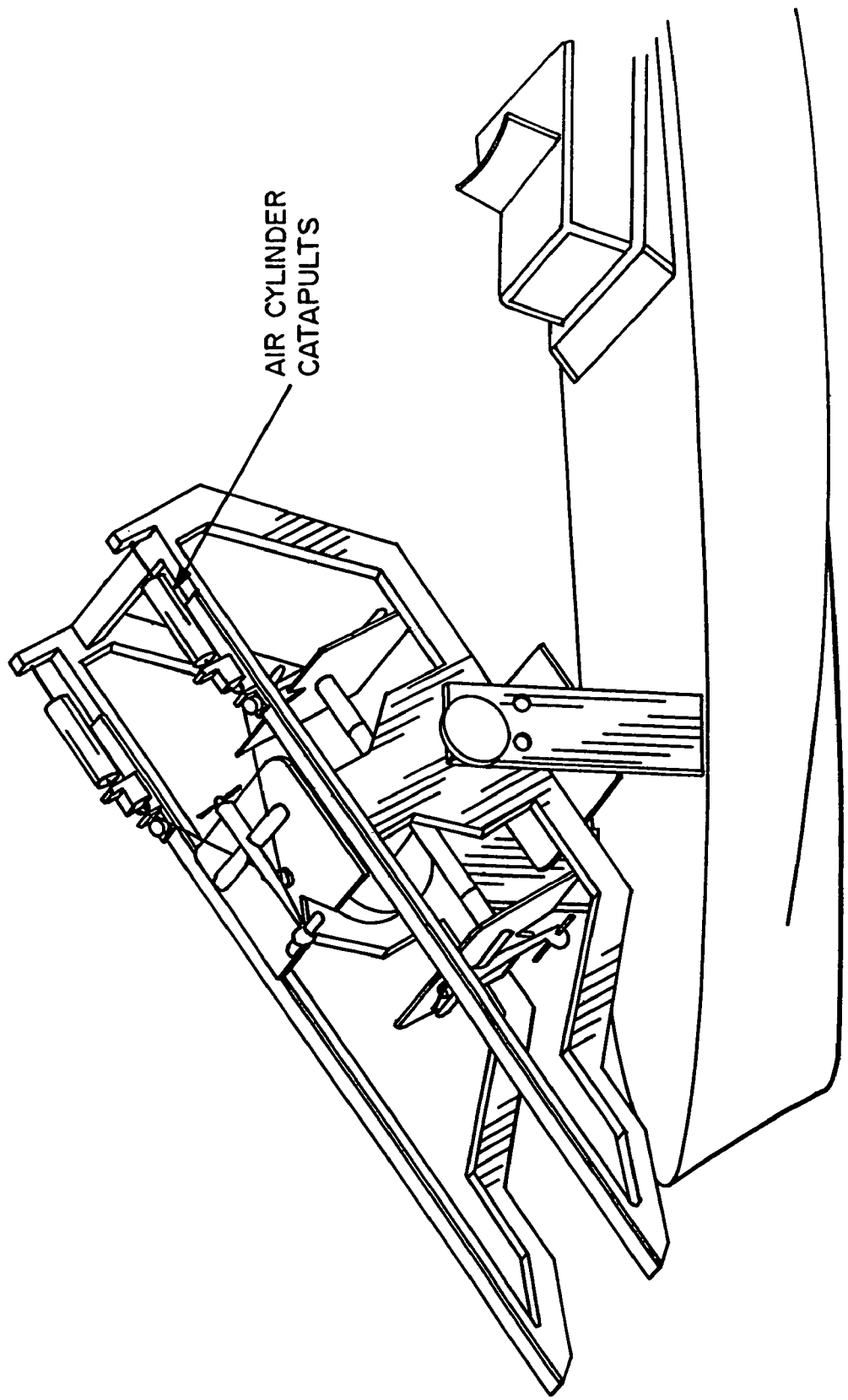
FIG. 7 is a photograph of the SEATAC system showing the launch/relaunch phase.

As depicted in FIG. 7, the SEATAC system now executes the fifth and final phase of autonomous UAV recovery, the "re-launch" phase. Once the UAV has been recharged/refueled, it can either be rotated into one of the three storage positions or be immediately prepared for re-launch.

The SEATAC 360SC connector is modular. The number of electrical connections will be optimized to accommodate a wide variety of UAVs. Depending on the number of electrical contacts determined to be necessary, the appropriate contact pins and PCB contact pads will accommodate them. The 360SC connector will have self-wiping, spring-loaded pin contacts.

The 360SC compression spring-loaded connector contact pins, keep a constant pressure between the metallic contact surfaces within the two portions of the connector, and thus compensate for twisting, vibration, and turning of the connector. Meanwhile, a second set of contact pins will maintain a redundant electrical connection to each contact ring, ensuring that at all times at least one of the spring-loaded contact pins is in electrical contact with the metallic ring on the female half of the 360SC.

Moreover, electrical contact will continue should one of the pair of redundant contact pins be damaged. When appropriate, this same arrangement will apply to data pins. Mill-Max-Mfg. Corp. in Oyster Bay, N.Y. manufactures a contact spring-loaded pin designed for a minimum life cycle of 100,000 connects-disconnects.

Figure 8:
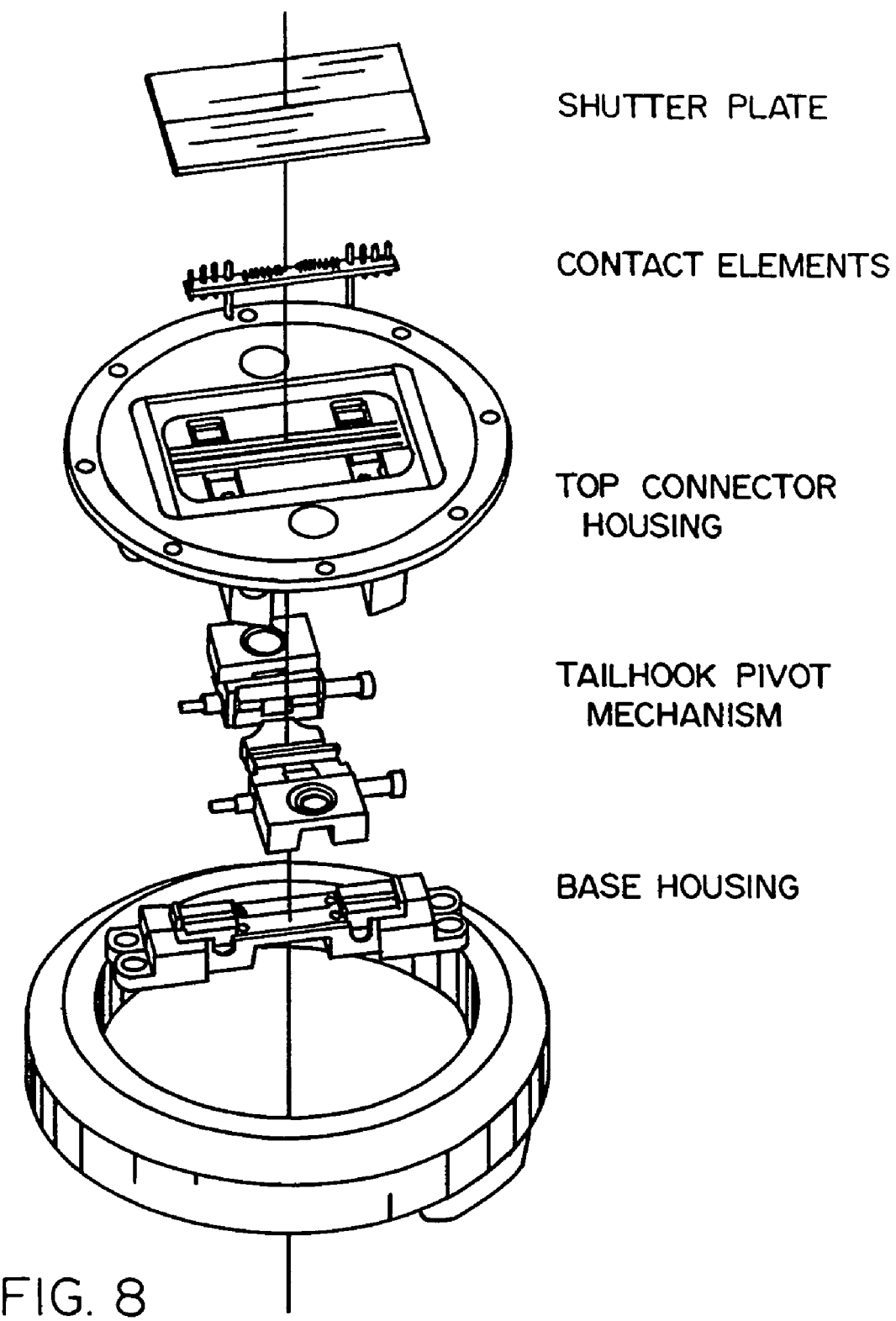
FIG. 8 is an exploded view of the SEATAC connector embodiment.

The connector components (see FIG. 8) will be fabricated by metal casting. Metal casting, in which molten metal is forced into a mold cavity under pressure, is well suited to an application requiring anywhere from ten or twenty to billions of pieces. Typically, to achieve parts with high precision, cast metal undergoes machining/grinding from a few seconds to several minutes, depending upon the configuration of the part. The initial step of immersing the steel parts in a hot solution of salts forms an oxide film. A supplementary treatment with black oxide coating (oil displacement per MIL-C-16173 Grade 3 or protective treatment of MIL-C-16173) increases corrosion protection.

Connectors for military use must operate reliably despite harsh, varied, and extreme environmental conditions, under all conditions of temperature and precipitation in all climate zones.

The auto-sealing mechanism must have the following capabilities: automatic sealing, even in harsh environments; and a "no-power" mechanical implementation of the auto-seal mechanism. A rectangular shutter plate, an element of the 360SC design, is presently preferred as the 360SC auto-sealing mechanism. The rectangular shutter is spring loaded, and is engaged/disengaged by the mechanical motion of two guide-pins. This automatically seals the contacts to prevent contamination. An O-ring surrounds the entire contact area of the 360SC connector. Regardless of whether the 360SC connector is in use or not, it will be environmentally sealed. O-ring material candidates include silicone, fluorosilicone, neoprene rubber, Viton, and other synthetic elastomerics. The type of static seal will be selected from among face, radial, dovetail, and half-dovetail O-ring grooves.

Figure 9:
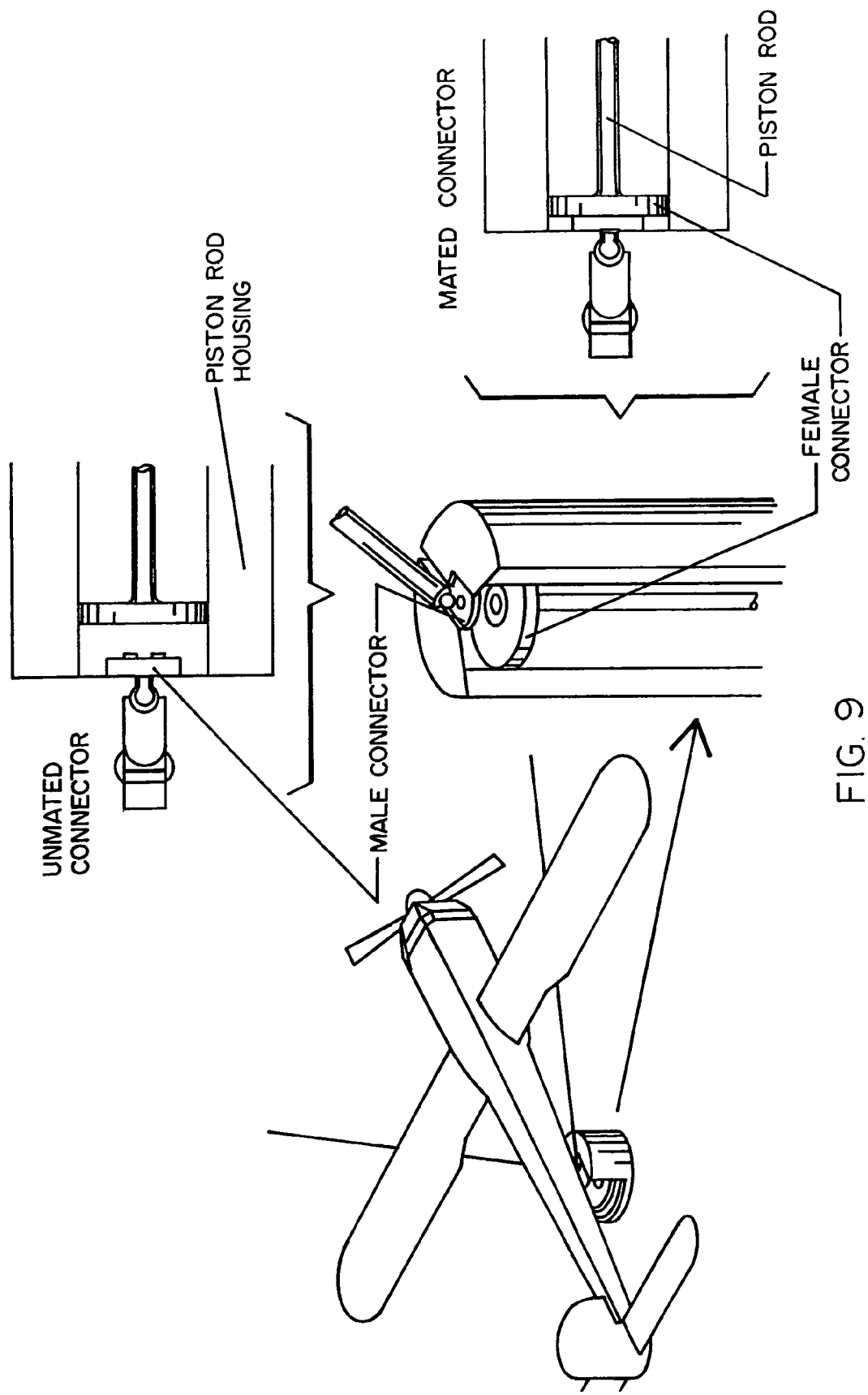
FIG. 9 is a photograph illustrating the mating mechanism of the SEATAC connector embodiment.

FIG. 9 depicts the piston-rod mating mechanism of the 360SC connector. Depending on the friction generated by the sliding motion that expands the torsion spring into the locking groove and the seal in the mating surfaces inside the connector, the total amount of force needed to engage the two portions of the 360SC connector is directly proportional to the stiffness of the spring and the clearance in the groove in the connector. The true 360° connection capability with self-aligning mechanism allows for solid mating even under harsh marine conditions. Because of its true 360° symmetrical connection design, the 360SC connector does not require vertical angular alignment.

Connector for Multifunction Shipboard Equipment (SEADOG)

Figure 10A:
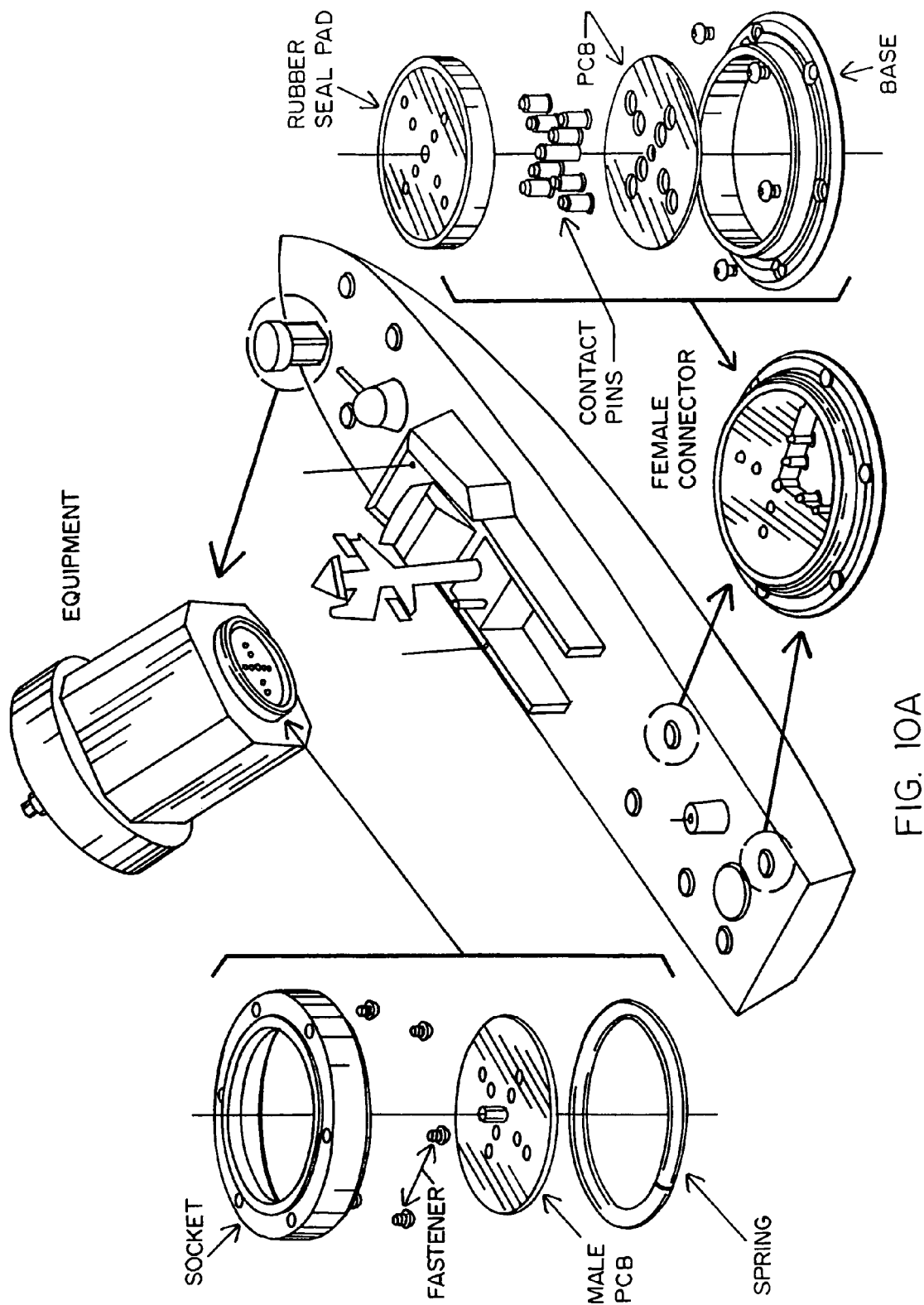
FIG. 10 is a conceptual drawing of the SEADOG connector embodiment of the present invention.
Figure 10B:
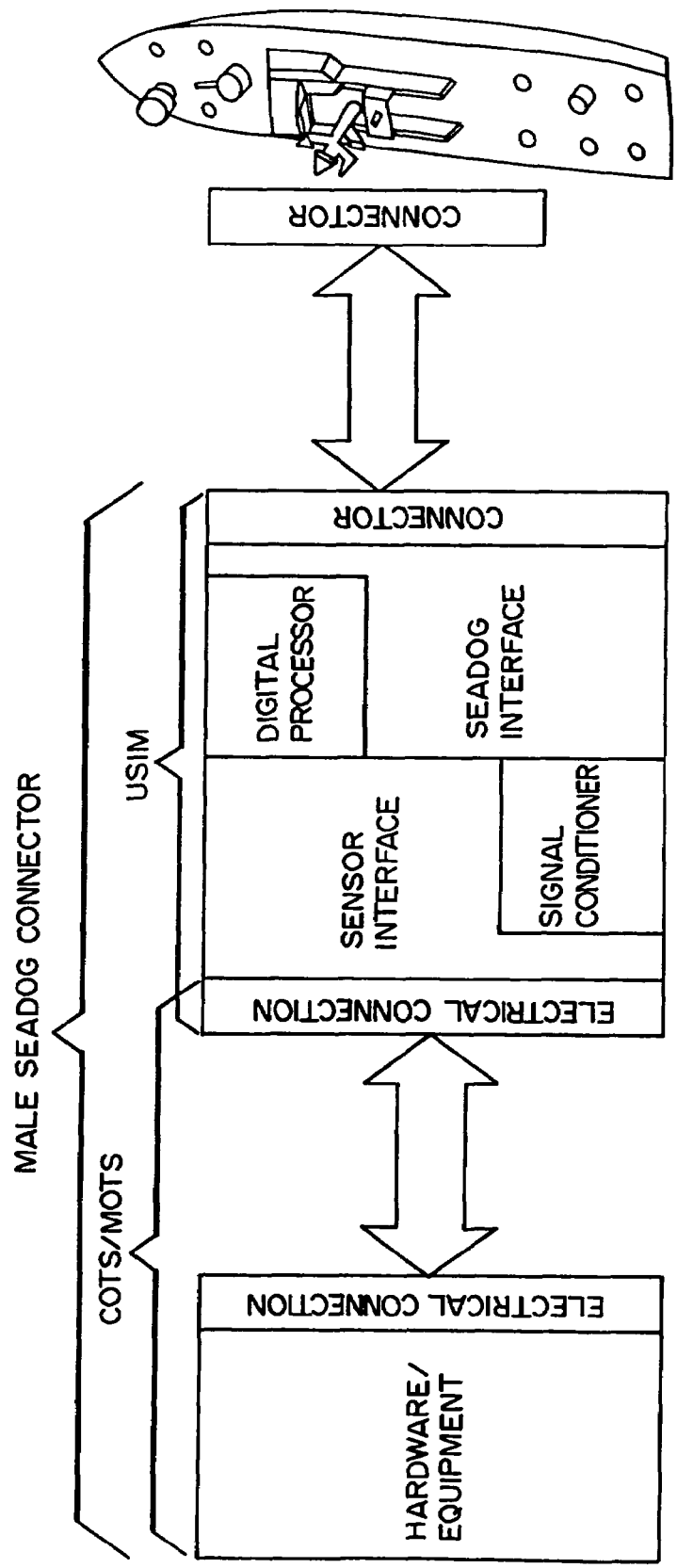

Referring now to FIG. 10, it will be seen that another embodiment of the present invention (referred to herein as the SEADOG connector) is used as the principal component in a system installed on the deck surface of ships to facilitate selective mating of different types of equipment depending upon the desired operation function of the vessel.

The disclosed SEADOG system has the following advantages:

"Plug-and-play" functionality for connecting electrical power, data and mechanical interfaces simultaneously.

True 360° connection in harsh weather, high sea states, total darkness and any combination thereof. When the two sides are connected, coupling can be locked in place or rotated to any orientation without reducing physical integrity or disrupting data and power flow.

Self-closing environmental shutter or seal that protects mechanical and electrical components whether the connector is attached or unattached.

Cylindrical, low profile, user-intuitive and easily scalable Form factor. This avoids deck obstacles and hazards when the connector is not in use. The round shape contributes to inherent impact resistance and maximizes internal space.

Since all SEADOG connectors are circular, the central Portion of the connector can accommodate fluid gas connection lines.

Use of self-aligning male connector that snaps into the female connector to guide the SEADOG connector into the proper location and orientation.

Use of Universal Sensor Interface Module (USIM) for universal interchangeable and fully configurable electrical/optical/mechanical compatibility.

These innovations fully address the need for a capability to place equipment on a vessel and secure it to the structure with a multi-function connector. Once mounted, the equipment installation is complete since all other ship systems are interfaced via the same multifunction connector. Thus, a minesweeper could easily be reconfigured as a task force long-range picket by adding a radar array, or a troop transport could be shifted to anti-submarine warfare duties by adding the appropriate sonar modules. The multi-function SEADOG connector therefore serves as an instant force multiplier, reducing the need to physically transport large task forces across oceans, since ships can be reconfigured quickly for needed tasks.

The SEADOG connector embodiment is a rugged electrical connector based on a snap-fastener-type mechanical design to ensure ease of use and mechanical stability.

A torsion spring provides first-level mechanical interlocking of the two portions of the SEADOG connector. This torsion spring is flexible and accommodates bending under a normal load, and also applies enough pressure to the adjacent contact surface to stabilize connection elements and equipment. The torsion spring is made from high-grade stainless steel. Its diameter and stiffness depend on the weight of the equipment and the desired locking and unlocking force. For smaller versions of the SEADOG connector, first-level interlocking on its own will suffice. For larger SEADOG connectors, a second-level interlocking mechanism will be used in addition to the first-level interlock provided by the torsion spring, as shown in FIG. 11. This mechanism uses a coarse-thread screw-type mating scheme. After the self-aligning first-level interlock is in place, the SEADOG connector is rotated in a clockwise direction to provide positive mechanical interlocking. Once the threads of the male and female portions of the SEADOG connector are fully engaged, the connector becomes one rigid body. This secondary interlocking mechanism will ensure mechanical stability and security for larger loads that bear the male half of large-diameter SEADOG connectors on their undersides.

An enhanced SEADOG connector will also include optical and coaxial connections. The connector housing can be easily modified to accommodate more or fewer optical and RF or coaxial connections. The SEADOG connector is modular. The number of electrical connections can be easily adapted to fit a particular application, even up to hundreds of contacts. Depending on the number of electrical contacts needed, the appropriate contact pins and PCB contact pads will accommodate them. The SEADOG connector will have spring-loaded, self-wiping pin contacts (see FIG. 12(*a*)). Being compression-spring loaded, the SEADOG connector contact pins will compensate for vibration, twisting, and turning of the connector by keeping a constant pressure between the metallic contact surfaces within the two portions of the connector. A second set of contact pins will be used to provide a redundant source of power to each contact ring (see FIG. 12(*b*)). This mechanical redundancy will ensure that at least one of the spring-loaded contact pins in the redundant pair is in electrical contact with the metallic ring on the opposite half of the SEADOG connector at all times. Additionally, if one of the pairs of redundant contact pins becomes damaged, its twin will continue to provide electrical contact. The same arrangement will be applied to data pins when appropriate.

The SEADOG female connector mounting procedure is analogous to the mounting of tire rims to the axle shafts in automobiles. The enhanced SEADOG connector will fasten to the vessel deck surface through the use of screw fasteners (see FIG. 13). The screw fastener material, a high-grade steel subjected to a galvanizing treatment, will help to prevent corrosion. The deck surface will have circular threaded bolt patterns matching the through-hole pattern on the female connector base. Moreover, a through-hole will be included in the center of the threaded bolt pattern for passing electrical data and power lines that are integrated with the female connector contact pads. Depending on the specific category of the connector, the dimensions for the bolt pattern and center through-hole conform to current established standards. The use of fasteners will allow connectors to be quickly released for any repairs or replacement.

Connector components will undergo various manufacturing processes (see FIG. 14). Metal casting is ideal for fabricating a metal housing:

Metal casting, in which molten metal is forced into a mold cavity under pressure, is well-suited to applications requiring anywhere from 10 or 20 pieces to billions of pieces. Cast metal typically undergoes machining/grinding to achieve high-precision parts. Cycle times range from a few seconds to several minutes, depending on the configuration of the part.

The cast parts will need a further surface treatment to protect them from the environment. Most military hardware is given a black oxide treatment. The initial step in the black oxide treatment is to introduce steel parts to a hot solution of salts. Through this initial step, an oxide film is formed. Black oxide coatings typically are given a supplementary treatment (i.e., oil displacement per Mil-C-16173 Grade 3 or a protective treatment per Mil-C-16173, to increase corrosion protection). The black oxide process does not affect any dimensional, physical, or mechanical properties of the part. The finished part is an attractive black, which reduces light reflection.

The long-term reliability of a connector depends largely on how well its specially designed contacts maintain a contact resistance below the specified ceiling. The connector, which consists of a socket and a plug similar to a snap fastener mechanism, can be divided into four components that have associated failure mechanisms caused by stresses from the environment and operating conditions:

The contact, which is the separable surface

The spring mechanism, which applies the contact force

The crimp mechanism, which connects the connector to a wire

The housing, which electrically insulates and generally protects the device.

The four components are all subject to chemical, mechanical, and physical processes that can cause connector failure. These processes can also combine to accelerate failure.

Connectors for military use must be reliable despite harsh, varied, and extreme environmental conditions. Temperature and humidity are important to the connector, as temperature affects the rate of reaction of chemical, physical, and mechanical processes in the connector, which in turn affect relaxation of the spring mechanism. Temperature variations cause fatigue in mechanical components by expansion and contraction. High levels of humidity also exacerbate corrosion. The connector must operate in all weather conditions and environments, including five climatic zones with respect to temperature and precipitation.

The connector is exposed to the environment, and may be used in areas with high levels of air pollution, including hydrocarbons, benzene, carbon monoxide, lead, nitrogen dioxide, ozone, and sulphur dioxide. These pollutants can corrode the connector. The atmosphere on a battlefield can speed up this degrading effect on electronic components such as connectors. Such performance degradation was observed in the Gulf War in the early 1990s as a result of >600 oil wells burning for up to eight months, polluting the atmosphere in the Persian Gulf region for some time. One possible solution for reducing the degradation induced by pollutants is contact lubrication and connector sealing to prevent access of pollutants to the contact surfaces.

The concept behind the SEADOG auto-seal comes partly from the automatic lens caps on commercially available cameras, on which the cap acts as a shield to prevent any dust or dirt from damaging the lens. The auto-sealing mechanism will operate in a similar fashion, with the following capabilities:

Automatic sealing in harsh environments
User-transparent operation
Purely mechanical implementation (no power requirements).

The structure for using an X-shaped shutter plate as an auto-sealing mechanism is shown in FIG. 15. The X-shaped shutter is a preferred feature of the auto-sealing connector design. The shutter is spring-loaded, and locks when the housing is twisted 90° to engage the connector. This automatically seals the contacts to prevent any chemical or environmental exposure. It is transparent to the user and foolproof in the field. FIG. 15(*a*) shows the X-shaped shutter plate in the auto-sealed operational position. When the connector is not in use, the shutter plate automatically seals the contacts by means of torsion springs. FIG. 15(*b*) shows the X-shaped shutter plate in the open position, exposing the contact pins. When the male housing snaps onto the connector and is twisted 90°, it exposes the contacts and the connection becomes operational. When the male connector is unsnapped, the X-shaped shield automatically retracts to the sealed position, eliminating the possibility of environmental contamination through user error.

As an alternative to a mechanical shutter in the SEADOG connector, elastomers (i.e., O-rings) can surround the SEADOG connector electrical contact area as a whole. Additionally, a solid conformal molded rubber pad will surround all nonmating contact surfaces (see FIG. 12). This rubber pad may also contain EMI/RFI/ESD filtering electronics embedded within it. These electronic components will contact the SEADOG connector pins on their nonmating surfaces. Silicone hybrid material is the leading candidate for both the O-ring and the molded rubber pad. Other candidates include fluorosilicates, neoprene rubber, Viton, and other synthetic elastomers. The connector will be environmentally sealed both when it is in use and when it is not. Several O-ring and O-ring gland mechanical designs are under consideration. The seal type required here is a dynamic rather than a static seal. The type of dynamic seal will be selected from: face, radial, dovetail, and half-dovetail O-ring grooves. Each of these types of seal has advantages and disadvantages. Design trade-offs in terms of overall cost, machining/molding costs, assembly complexity and cost, maintenance complexity and cost, and materials suitability will be considered.

Figure 16:
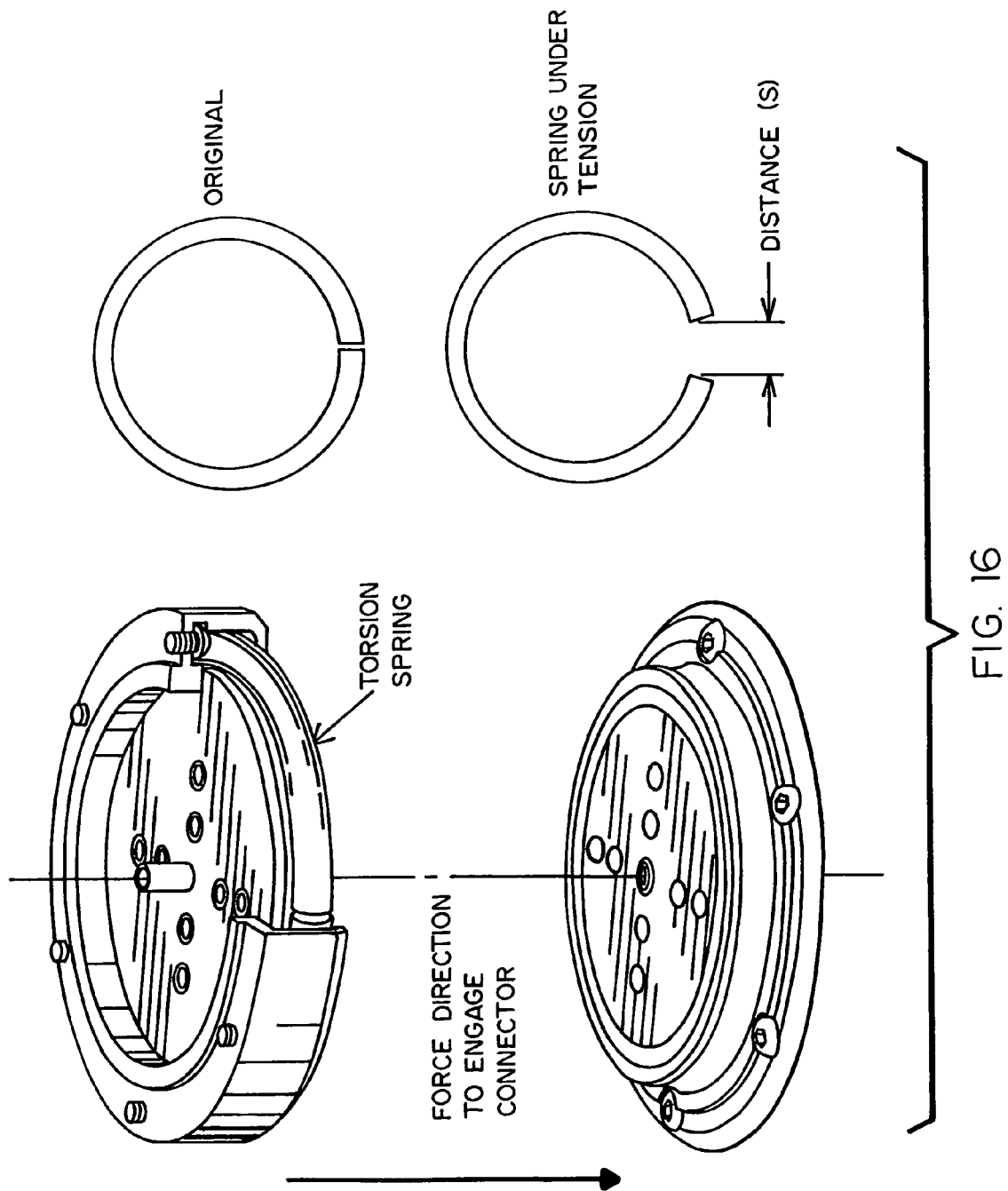
FIG. 16 illustrates the locking mechanism of the SEADOG connector embodiment.

The SEADOG connector design incorporates a locking method that closes two mating connector parts with a force to overcome the torsion spring. FIG. 16 shows the locking mechanism.

The total amount of force needed to engage the couplers depends on the friction caused by the sliding motion that expands the torsion spring into the locking groove and the amount of friction (f) generated by the seal in the mating surfaces inside the connector. The friction (f) is a variable that directly depends on the seal contact area (A) and the force generated by the seal as it is compressed against the mating surface in the connector. The total contact retention force is directly proportional to the stiffness of the spring and the clearance in the groove in the connector.

The SEADOG connector will be easy to use even under conditions of darkness and hazardous environmental conditions (rain, snow, etc.). It can accommodate both optical and electrical connectors in a single device and also allow fluid or gas connectors. Use of the inventive connector will reduce connector failure rate, reduce changeover, and increase flexibility. It will be easily integrated into military equipment, and it can be operated with one hand for lightweight equipment. The true 360-degree connection capability (see FIG. 17) with the self-aligning mechanism allows for relatively easy mating/disconnect even in harsh weather conditions with minimal visibility. Because of the true 360° symmetrical connection capability, connectors do not require vertical angular alignment. Further, when connected, the connector can be either physically locked in place or rotated to any orientation without diminishing the physical integrity or disrupting the flow of data and power.

Also, because of the inherent mechanical design of the connector, the surrounding areas of the contact elements will be protected with hardened metallic materials. These materials will provide environmental and EMI protection.

The SEADOG connector will handle full-speed USB data transfer at 12 Mbps, analog video at 4.5 MHz, USB 2.0 high speed at 480 Mbps, and FireWire (IEEE 1394) at a rate of 400 Mbps. Coaxial SEADOG connectors will be used for analog video and RF signals.

Having thus disclosed preferred embodiments of the present invention, it will now be apparent that the illustrated examples may be readily modified without deviating from the inventive concepts presented herein. By way of example, the precise shape, dimensions and layout of the connectors and connector pins may be altered while still achieving the function and performance of an electrical connector for harsh environments. Accordingly, the scope hereof is to be limited only by the appended claims and their equivalents.

The invention claimed is:

1. A connector having matable first and second portions configured for mating irrespective of the angular orientation of the first portion relative to the second portion over 360° to enable connection in difficult conditions; the connector comprising:
   a first connector portion having spring-loaded pins with axial ends;
   a second connector portion having a contact pad member having a plurality of electrically isolated concentric annular contacts, each said contact receiving at least a respective one of said pin axial ends to form an electrically conductive path through a respective pin and contact when said first and second connector portions are mated; and
   a piston affixed to one of said first and second connector portions for autonomously mating said portions mechanically and electrically upon activation of said piston.

2. The connector recited in claim 1 wherein said first connector portion has at least two of said spring loaded pins at spaced-locations and being electrically interconnected; and wherein said at least two pins are received by a common annular contact upon mating of said first and second connector portions.

3. The connector recited in claim 1 wherein one of said first and second connector portions is mounted to an unmanned aerial vehicle.

4. The connector recited in claim 1 further comprising a center interface in said first and second connector portions.

5. The connector recited in claim 4 wherein said center interface is a coaxial cable connection.

6. The connector recited in claim 4 wherein said center interface is a fluid interface.

7. The connector recited in claim 6 wherein said fluid is fuel.

8. A connector comprising matable first and second portions, the first portion being affixed to an object and the second portion being affixed to a piston adjacent the object for autonomous mating mechanically and electrically with the first portion upon activation of the piston;

the first connector portion having spring-loaded pins with axial ends;

the second connector portion having a contact pad member having a plurality of electrically isolated concentric annular contacts for receiving said pin axial ends to form electrically conductive paths through respective pins and contacts when said first and second connector portions are mated.

9. The connector recited in claim 8 wherein said first connector portion has at least two of said spring loaded pins at spaced-locations and being electrically interconnected; and wherein said at least two pins are received by a common annular contact upon mating of said first and second connector portions.

10. The connector recited in claim 8 wherein said object is an unmanned aerial vehicle.

11. The connector recited in claim 8 further comprising a center interface in said first and second connector portions.

12. The connector recited in claim 11 wherein said center interface is a coaxial cable connection.

13. The connector recited in claim 11 wherein said center interface is a fluid interface.

14. The connector recited in claim 13 wherein said fluid is fuel.

* * * * *